J. POWERS.

HOD ELEVATOR.

No. 10,052. Reissued Mar. 7, 1882.

WITNESSES:

A. S. Filch

A. G. N. Vernilya

INVENTOR

Jesse Powers

BY S. P. Filch

ATTORNEY

N. PETERS. Photo-Lithographer, Washington, D. C.

UNITED STATES PATENT OFFICE.

JESSE POWERS, OF CHICAGO, ILLINOIS.

HOD-ELEVATOR.

SPECIFICATION forming part of Reissued Letters Patent No. 10,052, dated March 7, 1882.

Original No. 105,246, dated July 12, 1870. Application for reissue filed January 13, 1882.

*To all whom it may concern:*

Be it known that I, JESSE POWERS, of Chicago, in the county of Cook, State of Illinois, have invented a new and Improved Hod-Elevator; and I do hereby declare that the following is a full, clear, and exact description thereof, which will enable others skilled in the art to make and use the same, reference being had to the accompanying drawings, forming a part of this specification, in which—

Figure 1:
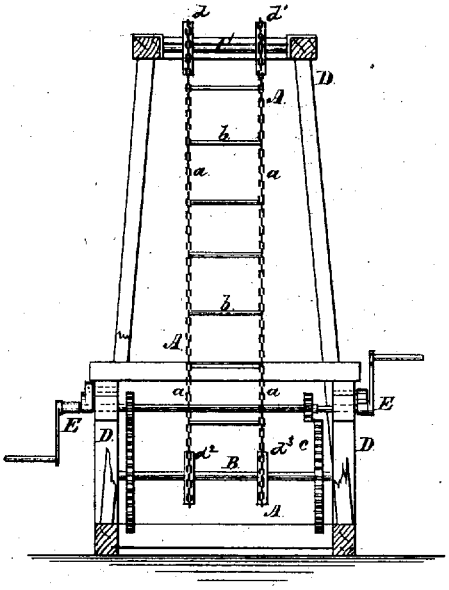
Figure 2:
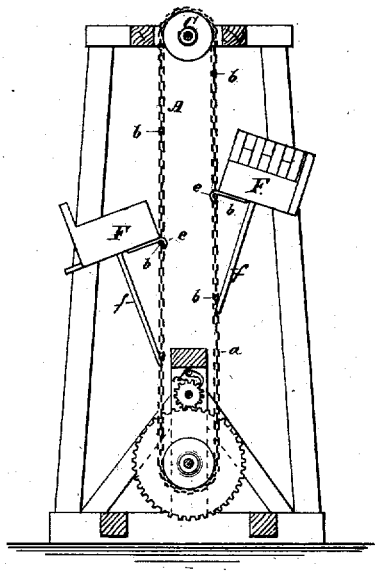

Figure 1 represents a side elevation of my improved hod-elevator; and Fig. 2 is a vertical transverse section of the same, and showing the hods employed in connection with the elevator suspended thereon.

Similar letters of reference indicate corresponding parts.

My invention relates to hod-elevators; and it consists in an improvement thereon, to be specified hereinafter, whereby the hod employed is rendered detachable, works in a perpendicular line, and thus avoids any dumping of the bricks at either end of the elevator.

A is an endless ladder, composed of two chains or belts, *a a*, which are connected by rounds *b b* at suitable distances apart. This ladder is fitted around the shafts B and C, of which one is hung in a frame, D, that may stand upon the ground, while the other is hung either in the upper part of the same frame D or in a separate frame in the upper part of the building being erected. The shaft B is, by suitable gear-wheels, *c*, or otherwise, connected with a shaft, E, to which, by muscular or other power, rotary motion is imparted. A pawl, *d*, catching into one of the gears, may be used to prevent the turning of the shafts in the wrong direction.

At F is the hod used in connection with the described devices, and the hod has a hook, *e*, secured to one end of the bowl, as shown, whereby it can be suspended from a round of the ladder. The hod has a shank, *f*, which, when the hod is suspended to the ladder by its hook *e*, rests against a lower round and holds the hod in the proper position. The hods thus constructed, when filled, are carried to the ladder and hooked onto the same. The ladder is revolved upon the shafts B and C, and the hod thus elevated. At the desired height each hod is taken off and carried to the proper place. The empty hods can be hung to the descending side of the ladder to be lowered. The hods will then be elevated by machinery, but need not be emptied until they arrive at the place of their destination.

The gearing may be so arranged by suitable mechanism of well-known construction that the power may be varied in conformity with the load to be elevated.

What I claim, and desire to secure by Letters Patent, is—

1. The endless traveling ladder A, combined with a detachable hod, F, having hook *e* and shank *f* attached thereto, the said hook being attached to one end of the hod, as and for the purpose described.

2. The hod F, provided with the shank *f* and hook *e*, secured to one end of the hod, adapted to be suspended upon a round of the traveling ladder A, as and for the purpose described.

JESSE POWERS.

In presence of—
A. G. W. VERMILYA,
A. S. FITCH.